United States Patent
Wendker et al.

(10) Patent No.: US 10,296,545 B2
(45) Date of Patent: May 21, 2019

(54) UNIT CONVERTER WITH SORTED LIST OF RESULTS

(71) Applicant: Apple Inc., Cupertino, CA (US)

(72) Inventors: Andreas W. Wendker, Woodside, CA (US); Arnaud Douceur, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 14/325,097

(22) Filed: Jul. 7, 2014

(65) Prior Publication Data

US 2015/0347530 A1 Dec. 3, 2015

Related U.S. Application Data

(60) Provisional application No. 62/005,823, filed on May 30, 2014.

(51) Int. Cl.
*G06F 17/30* (2006.01)
*G06F 16/9535* (2019.01)

(52) U.S. Cl.
CPC ................................ *G06F 16/9535* (2019.01)

(58) Field of Classification Search
CPC ............... G06F 17/308; G06F 15/0258; G06F 17/30554; Y10S 707/99937
See application file for complete search history.

(56) References Cited

U.S. PATENT DOCUMENTS

| | | | |
|---|---|---|---|
| 7,305,381 B1 * | 12/2007 | Poppink | G06Q 10/107 |
| 7,437,358 B2 | 10/2008 | Arrouye et al. | |
| 8,091,024 B2 | 1/2012 | Graeber | |
| 8,126,881 B1 * | 2/2012 | Sethi | G06F 17/30536 |
| | | | 707/723 |
| 8,443,018 B2 | 5/2013 | Choi et al. | |
| 8,688,701 B2 | 4/2014 | Ghosh et al. | |
| 9,727,644 B1 * | 8/2017 | Teng | G06F 17/30861 |
| 2003/0101204 A1 * | 5/2003 | Watson | G06F 15/0258 |
| | | | 708/206 |
| 2004/0267717 A1 * | 12/2004 | Slackman | G06F 17/30675 |
| 2006/0182368 A1 * | 8/2006 | Kim | G06F 17/30799 |
| | | | 382/305 |
| 2008/0046491 A1 | 2/2008 | Gupta et al. | |
| 2009/0240751 A1 * | 9/2009 | Renshaw | G06F 15/0258 |
| | | | 708/131 |

(Continued)

OTHER PUBLICATIONS

CNETDL, ConvertPad—Perform various conversions on your device—Download Video Previews, Apr. 16, 2014, YouTube, https://www.youtube.com/watch?v=NxybG_J9bfE.*

(Continued)

*Primary Examiner* — Usmaan Saeed
*Assistant Examiner* — William P Bartlett
(74) *Attorney, Agent, or Firm* — Womble Bond Dickinson (US) LLP

(57) ABSTRACT

Unit conversion methods and systems that use an auto-scaling algorithm to sort conversion results. A plurality of unit conversion results, which represent a conversion of an input value in an input unit, are sorted into a sorted list based on the scale of the values in the results and the sorted list is presented (e.g. displayed) to a user. In one embodiment, the sorting is done without regard to the units in the conversion results and values between zero and one are transformed before sorting.

18 Claims, 6 Drawing Sheets

(56) References Cited

U.S. PATENT DOCUMENTS

| | | | | |
|---|---|---|---|---|
| 2011/0252030 A1* | 10/2011 | Spangler | ............ | G06F 17/30675 707/729 |
| 2012/0143861 A1* | 6/2012 | Sethi | ................. | G06F 17/30536 707/731 |
| 2013/0285926 A1* | 10/2013 | Griffin | ................ | G06F 3/04886 345/173 |
| 2014/0013219 A1* | 1/2014 | Liu | ......................... | G06F 17/27 715/255 |
| 2014/0129559 A1* | 5/2014 | Estes | ................. | G06F 17/30424 707/737 |

OTHER PUBLICATIONS

Simanek, 8. Data Analysis, 1996, 2004, p. 7, https://www.lhup.edu/~dsimanek/scenario/errorman/datanaly.htm.*

Henry, Alan, "Convert Everything Seriously Converts Any Unit of Measurement to Another", Lifehacker, Dec. 26, 2013, https://lifehacker.com/convert-anything-seriously-converts-any-unit-of-measure-1488850771.*

* cited by examiner

FIG. 4A input = 401
405
407 input = 100 mm

| | conversion results | score | rank |
|---|---|---|---|
| 403A → | 3.94 in | 3.94 | 1 |
| 403B → | 0.1 m | $\frac{1}{0.1} = 10$ | 2 |
| 403C → | 10 cm | 10 | 3 |
| 403D → | 0.0001 km | 10,000 | 4 |

FIG. 4B

401 input = 100 mm

| | conversion results | score | rank |
|---|---|---|---|
| 409A → | 3.94 in | 3.94 | 1 |
| 409B → | 10 cm | 10 | 2 |
| 409C → | 0.1 m | $(\frac{1}{0.1})^2 = 100$ | 3 |
| 409D → | 0.0001 km | $10^8$ | 4 |

FIG. 4C

| conversion results | input = 100 mm | | | | |
|---|---|---|---|---|---|
| | $\frac{1}{x}$ for 0 - to - 1 | | $\frac{1}{x^2}$ for 0 - to - 1 | | |
| | score | rank | score | rank | |
| 3.94 in | 3.94 | 2 | 3.94 | 1 | |
| 0.33 ft. | 3.05 | 1 | 9.29 | 2 | |
| 10 cm | 10 | 5 | 10 | 3 | |
| 0.109 yd | 9.14 | 3 | 83.61 | 4 | |
| 0.1 m | 10 | 4 | 100 | 5 | |
| 0.001 km | $10^4$ | 6 | $10^8$ | 6 | |
| 415 | 417 | 419 | 421 | 423 | |

UNIT CONVERTER WITH SORTED LIST OF RESULTS

This application claims the benefit of U.S. Provisional Patent Application No. 62/005,823, filed on May 30, 2014, which application is incorporated herein by reference.

BACKGROUND OF THE INVENTION

This disclosure relates to data processing systems that perform unit conversion, such as converting from a value in inches (in) to an equivalent value in centimeters (cm).

Unit conversions can be performed manually by using tables that specify conversion factors or can be performed by a data processing system, such as a computer (e.g. a desktop or laptop or tablet computer or smartphone, etc.). A user of a data processing system can select, usually through a software program designed to provide unit conversions, a conversion from one unit (e.g., millimeters (mm)) to another unit (e.g., inches or feet (ft)), and then enter an input value that is converted automatically to a value in the another unit (which can be referred to as the output unit). The user sets the conversion up on the data processing system by selecting the input unit and selecting the output unit; without this set up, the data processing system cannot determine the appropriate conversion factor to use on the input value. Hence, prior data processing systems require the user to select both the input unit and the output unit, although the software can pre-configure default settings for both the input unit and the output unit.

SUMMARY OF TILE DESCRIPTION

Unit conversion methods and systems in one embodiment can present (e.g., display) a plurality of conversion results which can be sorted by the scale of the values in the conversion results. The sorted list of conversion results can be presented (e.g., displayed) as a set of output values and their corresponding output units, with one output value being selected automatically as the top result based upon the scale of that output value relative to the other output values. The sorting in one embodiment can sort the output values from smallest to largest. In one embodiment, a set of output values between zero (0) and one (1) can be transformed by a transformation (such as a reciprocal, 1/x, or reciprocal to an exponential power (e.g. $1/x^2$)) before performing the sorting; this transformation can improve the sorting when small numbers could effect the ranking based on scale. In one embodiment, the sorting attempts to rank the output values in the conversion results based upon their closeness to the value 1.

In one embodiment, the sorting is performed without regard to the units in the conversion results; for example, the sorting is not based, in one embodiment, on distinguishing between metric and non-metric units. In another embodiment, a set of the units can influence the listing of the results by overriding score values that are used when sorting conversion results. For example, certain pairs of units can be established to be considered "best equivalents" such that when one of units in the pair is entered as an input unit then the other pair will be treated as the top ranking result (as an output unit) without regard to the scores calculated in the methods described herein, while the rest of the values in the conversion results will be ranked according to their scores. In one implementation of this embodiment the pair of miles per hour (mph) and kilometers per hour (km/h) is treated as a best equivalent. Other pairs can also be set up as best equivalents (e.g. miles per gallon and liters per 100 kilometers) while most other pairs are not treated this way (such that the calculated scores are not overridden).

In one embodiment, a method for performing unit conversion can include: receiving, at a data processing system, a user input within a text input field, wherein the user input includes data indicating an input value and an input unit; calculating a plurality of unit conversions from the input value in the input unit to other available units thereby providing a plurality of unit conversion results each of which has a value in one of the other available units; sorting the plurality of unit conversion results into a sorted list based on the scale of the values in the other available units; and presenting (e.g., displaying) the sorted list. In one embodiment, the text input field can be configured to do other operations in addition to unit conversions. For example, the text input field can receive text for searching for local and remote documents, files, web pages, social media sites, etc.; in one embodiment, the text input field can be an integrated, system-wide field that allows for searching and unit conversion. The searching can be for both local and remote documents and files and can use full text indexed content to search for the documents and files. For example, the searching can be similar to the searching provided by the one or more systems described in U.S. Pat. No. 7,437,358 which is incorporated herein by reference and which describes the Spotlight feature of the Macintosh OS X operating system. Thus, the same input (into a text input field) that is used for a unit conversion can, in one embodiment, also be used to search for local content (such as full text indexed content stored on a non-volatile storage of the data processing system) and for remote content (such as remote databases of social media websites and other websites and remote databases containing current events, news, movies, media content, etc.). In one embodiment, the data processing system can perform searches while a user types by predictively autocompleting search inputs as the user input is received.

The available units that can be converted can include one or more of: units for length; units for time; units for weight; units for velocity; units for volume; units for power; units for pressure; units for currency; units for area, etc.

In one embodiment, the methods described herein can be performed by a plurality of data processing systems, such as a server and a client coupled through a network (or network of networks such as the Internet). In this case, the server system can receive the input value and input unit and perform the conversion calculations and then sort the conversion results and transmit them to the client for display on a display device of the client.

Another aspect of this disclosure relates to a currency converter that can use, in one embodiment, a system locale setting (which can be set manually by a user in a user preference or can be set by the data processing system using position location technology such as Global Positioning System (GPS)). In one embodiment, the system locale setting can be used to select a default currency into which other currencies are converted. For example, if the system locale specifies the United States of America, then the top result in a currency conversion from other currencies can always be a conversion to U.S. dollars.

The various embodiments described herein can be employed in methods and in systems that use these methods and in non-transitory machine readable storage media that store executable program instructions which when executed can cause a data processing system to perform any one or more of the methods described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 4A shows the results of a method for scoring and ranking unit conversion results according to one embodiment.

FIG. 4B shows the results of a method for scoring and ranking unit conversion results according to another embodiment.

FIG. 4C shows the results of two embodiments for scoring and ranking conversion results.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
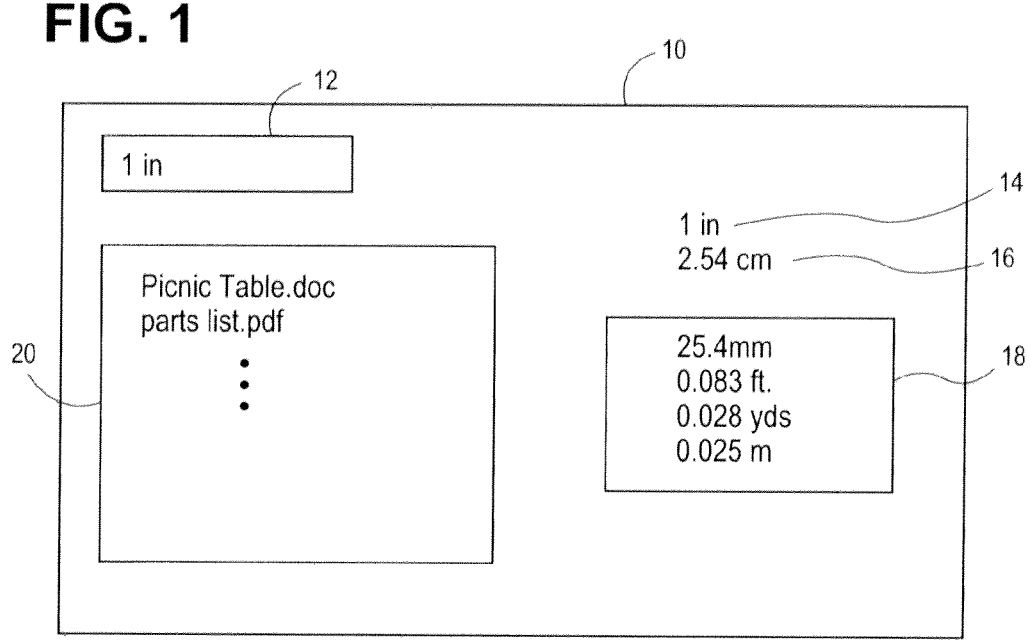
FIG. 1 shows an example of a combined search and unit conversion system with an embodiment of a user interface.

In one embodiment, a unit conversion system on a data processing system can use an automatic sorting method based on the scale of values within unit conversion results. The unit conversion results show a conversion of an input value, in an input unit, to output values in other units which can be referred to as output units. FIG. 1 shows an example of a user interface for a unit conversion system according to one embodiment. Search window 10 can include a text input field 12, a text search output region 20, and a sorted conversion results region 18. The text input field 12 can receive a user's text input (such as "1 in" or "1 inch" or "1000 inches" or other text input) and process that text input to perform a unit conversion or to perform a search for text (stored locally or remotely or both) or to perform a unit conversion and perform a search for text. The text search output region 20 can display the results of searching for text (within locally stored files and documents and/or remotely stored files and documents and web pages, etc.). The sorted conversion results region 18 can show a sorted list of conversion results for a given input value such as input value 14 (which is 1 inch in the case of FIG. 1); in one embodiment, the sorted conversion results region 18 can include all conversion results except for the highest ranking conversion result such as top conversion result 16 which is displayed (as shown in FIG. 1) in search window 10 immediately below the input value 14. In one embodiment, the conversion results are sorted based on the scale of the values such that values closer to 1 are ranked higher than other values not closer to 1. In one embodiment, the values can be ranked from smallest to largest with the smallest being designated as the highest ranking conversion result. In one embodiment, a set of values between zero (0) and one (1) can be transformed before the sorting, as explained further below, in order to prevent small fractions from being ranked too high.

In one embodiment, the sorting calculates a score for each value in the conversion results that is used to rank the conversion results, and the score is calculated without regard to the output unit or the input unit (so that the output unit or the input unit is not taken into account when performing the sorting). In another embodiment, the input unit or the output unit can be taken into account to influence the listing of the results, and this can be done by overriding the scores for the conversion results that are used when sorting the conversion results. For example, a pair of units can be considered to be "best equivalents" such that when one unit is entered (e.g. into field 12) as an input unit, the other unit is automatically treated as the top ranking result (as an output unit) without regard to its score relative to scores for other values in the conversion results. An example of such a pair can be miles per hour (mph) and kilometers per hour (km/h); when either is entered as the input unit then the value of the other unit in the pair will be ranked as the top conversion result regardless of the score of that value relative to the other values in the conversion results. In this case, if 60 mph is entered as the input value and input unit, then 96.56 km/h is listed and displayed as the top conversion result even though the smallest to largest sorting algorithm based on scores alone would display 26.8 m/s (meters per second) as the top conversion result. The rest of the values in the conversion result can remain in their order based on the original scores. Hence, if the set of conversion results for a 60 mph input was: 26.8 m/sec.; 52.1 knots; 88 ft./sec.; and 96.56 km/h (ranked in their order of smallest to largest without regard to units), then the effect of the best equivalent pair in this case changes the order to: 96.56 km/h, 26.8 m/sec., 52.1 knots and 88 ft./sec. moving the value for km/h out of the ordered sequence, as a result of this best equivalent pair, does not change the order in the sequence for the rest of the values in the sorted conversion results. Another example in one embodiment of a best equivalents pair of units can be miles per gallon and liters per 100 kilometers. These pairs can be exceptions to the general rule of sorting the scores from smallest to largest to rank the conversion results. Thus, in one embodiment, this exception is not applied to most of the pairs of units (and hence the calculated scores are not overridden).

Figure 2:
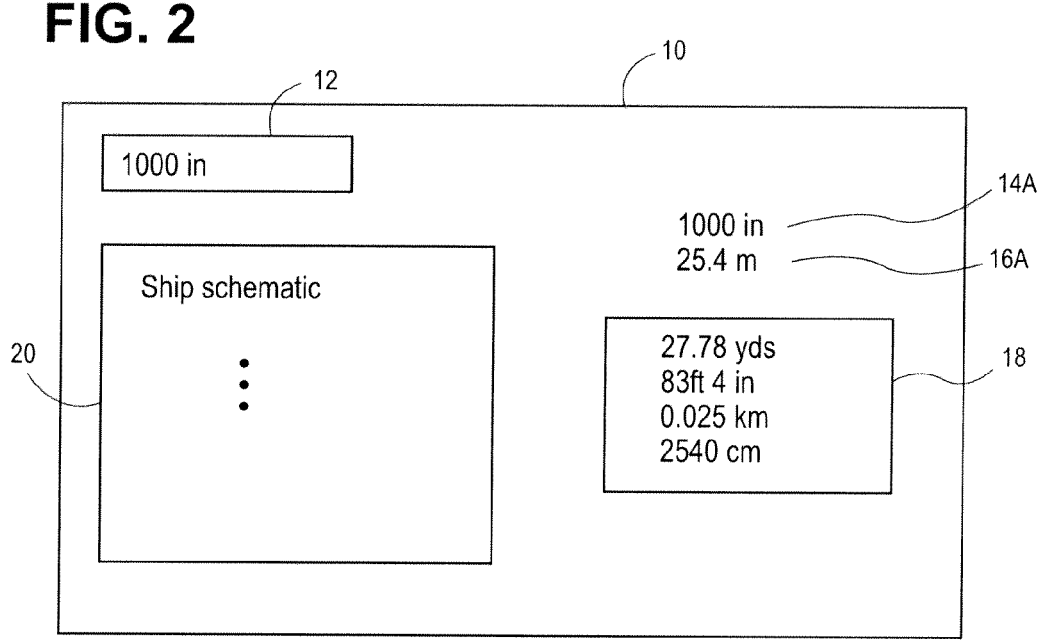
FIG. 2 shows an example of a combined search and unit conversion system.

FIG. 1 shows that a user has entered the number "1" and the text "in" into the text input field 12 and the data processing system which displays the search window 10 has interpreted "in" as the abbreviation for "inch" and has performed both a unit conversion (of 1 inch) into the output units of centimeters (cm), feet (ft), yards (yds or yd) and meters (m) and has also determined that several files or documents (such as "Picnic Table.doc" and "parts list.pdf") include the phrase "1 in" in those documents. Furthermore, the data processing system has displayed a list of those documents in the text search output region 20 and has displayed a sorted list of conversion results in region 18 and has displayed the top conversion result 16 (the highest ranking conversion result) below the input value 14. This allows the user to see the conversion results and also to see what files and documents contain the search query of "1 in". FIG. 2 shows another example of the search window 10 after the user has entered the phrase "1000 in" into the text input field 12. In response to this text entry, the data processing system has performed a unit conversion of the value 1000 in the input unit of inches into values in the output units of meters, yards, feet, centimeters and kilometers and has sorted the conversion results using one of the methods described herein to display the sorted/ranked conversion results in region 18. In addition, the data processing system has displayed the input value 14A and the top conversion result 16A which is the highest ranking conversion result based on one of the sorting methods described below. In addition, the data processing system has also performed a search for the phrase "1000 in" in files and documents (such as in the full text indexed content of locally stored documents on the user's data processing system) and has found files and documents which include or contain that phrase and has displayed those found files and documents in the region 20. It will be appreciated that the user interfaces shown in FIGS. 1 and 2 represent just one example of a search and unit conversion interface and that numerous other interfaces can be used with the various embodiments described herein. In some embodiments, an alternative user interface may not include the region 20 such that the window 10 displays unit conversion results but does not display search results; in another embodiment the unit conversion results and the search results (such as region 20) can be displayed in separate windows or panels or regions. The search window 10 can include additional features such as a "show all" command (to show all search results or all conversion results) and other commands to filter the results or otherwise process the results or re-do the search, etc. In addition, the user interface can include a user preference control region that allows a user to control how the search is performed and displayed and how the unit conversion process is performed and displayed. For example, a user preference control region may allow a user to select an alternative way of ranking unit conversion results, such as a ranking based on the type of unit (e.g., metric versus non-metric, etc.).

The data processing system that presents the search window 10 can use various underlying technologies to provide both local and remote searching of full text content in documents, files, web sites and social media databases. For example, the data processing system can use Spotlight technology, as described in U.S. Pat. No. 7,437,358 which is incorporated herein by reference, to create a full text index of text content within files stored locally on the user's data processing system (as well as remotely stored files not stored locally) and can search that index using the user's search input (such as the input entered into the text input field 12) to retrieve and display files that contain or otherwise match the user's search input. Furthermore, as described in U.S. Pat. No. 7,437,358, the data processing system can extract or otherwise obtain metadata from those files and search that metadata using the user's search input; for example, metadata of "0.25 sec." for the exposure time of a photograph (stored locally on the user's data processing system) would cause the name of the photograph to be retrieved and displayed in region 20 when the user enters "0.25 sec" into field 12, which in turn also causes the conversion results region 18 to display conversion results for 0.25 sec. (such as 250 milliseconds, 0.004167 minutes etc.). The data processing system, in one embodiment, can also use technologies that provide predicted search queries (using known auto-completion technology) while the user is entering a search query or other text entry into field 12 and the system can display search results based on the user's text entered so far based on the predicted search queries. In one embodiment, the data processing system can also perform searches of one or more remote web sites, web pages and social media databases in response to an input in text input field 12 and provide a list of matching results in region 20 based on those searches of remote web sites, web pages, and social media databases. For example, if a popular and current topic on Twitter is a float in a parade that was 1,000 inches long, the data processing system can retrieve and display in region 20 one or more matches from a database of tweets on Twitter about the float while also providing a set of conversion results for the input value of "1000 in" in field 12. U.S. Pat. No. 8,688,701, which is incorporated herein by reference, describes techniques for allowing for searches of social media databases, such as a database of tweets on Twitter. Further information about how local and remote search can be integrated with unit conversion in this manner is provided in the following U.S. provisional patent applications, all of which are incorporated herein by reference and were filed on May 30, 2014: "Multi-Domain Query Completion" by inventors including Saravana Kumar, Vipul V. Prakash, Rishab Ghosh, Lun Cui, and Chip Salzenberg, as disclosed in U.S. patent application Ser. No. 14/503,226 and published as U.S. 2015/0347503; "Use of User Feedback in a Citation Search Index" by inventors including Rishab Ghosh, Lun Cui, Vipul V. Prakash, Larry Rosenstein, and Kevin Hsu, as disclosed in U.S. application Ser. No. 14/503,159 and published as U.S. 2015/0347427; and "Federated Search" by inventors including Anoop Sinha, Chetan V. Kale, Jason L. Douglas, Kelvin So, and Vishnu Konda, as disclosed in U.S. application Ser. No. 14/503,138 and published as U.S. 2015/0347543. In one embodiment, the integration of local and remote searching and unit conversion can use remote sources (e.g. web sites or web pages or remote databases) of information such as Wikipedia (or other encyclopedic sources), movie database sources, current events sources, databases of social media content (e.g. Topsy), databases for media stores (such as an iTunes store or Amazon or Google Play containing songs, movies, books, magazines, etc.) and one or more maps databases. In an embodiment which integrates local and remote searching along with unit conversion, a user's input of "1000 in" in field 12 (as shown in FIG. 2) can cause the data processing system to retrieve and present search results matching files stored locally (e.g. "Ship Schematic" shown in region 20 in FIG. 2) as well as other search results found from such remote sources (e.g. databases of social media content, media stores, etc.) and also display sorted conversion results in region 18.

Figure 3:
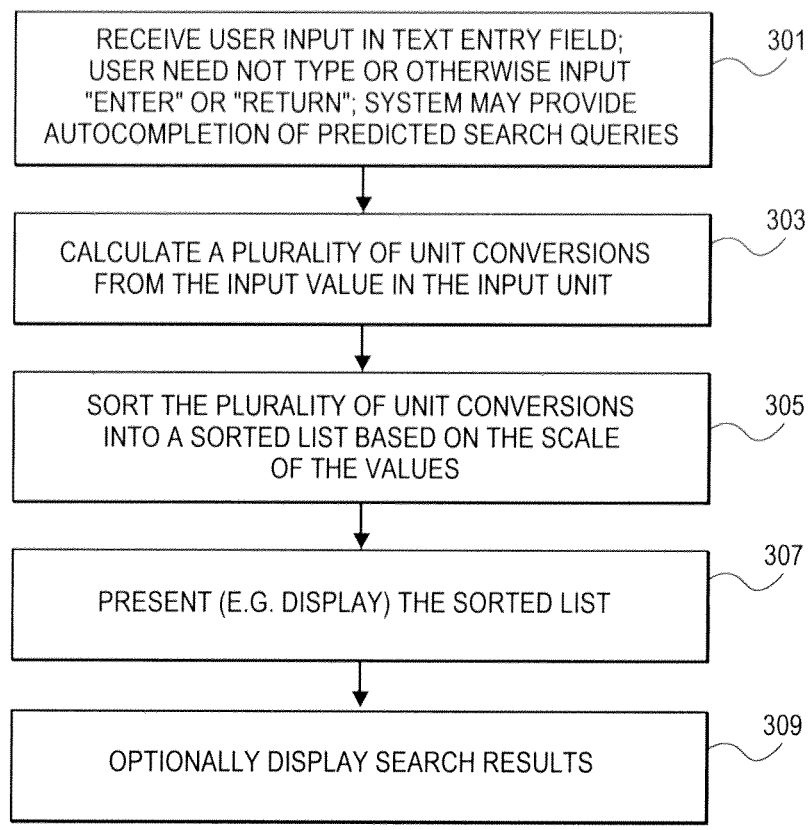
FIG. 3 is a flowchart that shows a method of performing unit conversion according to one embodiment.

FIG. 3 shows an example of a method for presenting a sorted list of conversion results where the results are scored and sorted/ranked based on the scale of the values in the conversion results. In operation 301, a data processing system receives an input in a field, such as the text input field 12. In one embodiment, the user need not type or otherwise input "enter" or "return" as the data processing system will perform the unit conversion (and optional local and/or remote text searching) without the "enter" or "return" key being pressed on a keyboard or touched on a virtual keyboard on a display screen. In one embodiment, the data processing system can provide autocompletion of predicted search queries as a user enters the input in operation 301, and the data processing system can search and display search results (which can be based on the predicted search queries) as the user enters the input such that the predicted search queries and the search results are displayed before the user finishes typing (or otherwise inputting) the input into the text entry field. In operation 303, the data processing system calculates a plurality of unit conversions from the input value in the input unit (received in operation 301); for example, as shown in FIG. 2, the data processing system can calculate a set of conversion results for the input value 1000 in the input unit of inches. Then in operation 305 the data processing system can sort the plurality of conversion results by calculating scores that are used to sort or rank the conversion results. In one embodiment, the scores of the conversion results are calculated by using the value of the conversion result if it is greater than or equal to 1 as the score (e.g. a conversion result of 2.54 cm shown in FIG. 1 has a score of 2.54) and if the value of the conversion result is less than 1 but greater than zero (0) then the value is transformed, in one embodiment by a transformation function, in order to obtain a score for the value. The transformation function can be the reciprocal of the value (e.g. $1/x$,) or the reciprocal of the value to an exponential power (e.g. $1/x^2$). The scores can, after all transformations are completed, be sorted from smallest to largest which will provide the ranked list of conversion results with the smallest score representing the highest ranked score. This method of score and ranking in effect sorts the results by their proximity or closeness to 1 while preventing fractions (especially small fractions) from being ranked high. The value of 0 (zero) for an output can be given a score of 1 in one embodiment, and ties can be arbitrarily broken by using the output unit to sort alphabetically (e.g. cm before m) or by using other techniques. In one embodiment, the sorting in operation 305 is performed without regard to most of the output units; for example, in one embodiment, no attempt is made to sort metric units together and separate from non-metric units. However, one or more pairs can be designated as each having being deemed "best equivalents" and treated in the manner described above. This scoring and sorting approach in one embodiment provides ranked results that match the input; for example, an input in the parsecs unit will result in a highest ranked output unit in light years or kilometers rather than a highest ranked output unit in feet or inches. In effect, this approach attempts to provide a scale of the result that is expected to be most likely desired by an average user. After the ranking is completed in one embodiment, the sorted list can be presented (e.g., displayed or spoken through a speaker, etc.) in operation 307. Optionally, in operation 309, the system can also display search results such as local and/or remote searches and searches through web pages, web sites, social media databases, etc. as described herein.

FIGS. 4A, 4B, and 4C show examples of how the scoring, using a transformation function for a set of values between zero and one can change the sorting based on the scores. The input value is 100 in the input unit of millimeters. In the case of the example shown in FIG. 4A, the transformation function is the reciprocal of the conversion result if the result is greater than zero and less than one. The scores, shown in score column 405, are the values of each conversion result (in the case of conversion results 403A and 403C) or the values obtained from the transformation function (in the case of the conversion results 403B and 403D), and these scores produce the rank in rank column 407. The first conversion result 403A is the highest ranked score as the scores are sorted smallest to largest. The tie between conversion results 403B and 403C can be broken arbitrarily or alphabetically based on the output units. In the case of the example shown in FIG. 4B, the transformation function is the reciprocal of the square of the conversion result (i.e., $1/x^2$), so the conversion result 409C (0.1 m) has a score of 100 and the score of the conversion result 409D is $10^8$. This results in no ties and increases the separation between values near (and above) 1 and values that are small or very small fractions. FIG. 4C provides another example of a set of conversion results 415 and their corresponding scores 417 and rankings 419 for a $1/x$, transformation function and also shows the corresponding scores 421 and rankings 423 for a $1/x^2$ transformation function. It will be appreciated that alternative transformation functions can be used in other embodiments and that the values that are transformed between zero and 1 (in the conversion results) can be restricted to a subset of the values (e.g. greater than 0 and less than 0.95, etc.) in certain embodiments depending on the desired effect of the transformation.

Figure 5:
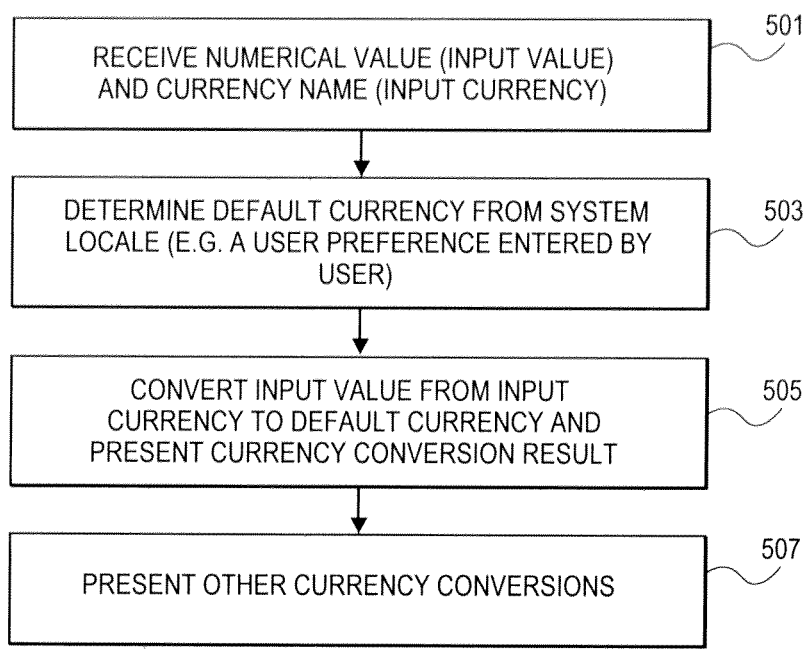
FIG. 5 is a flowchart that shows a method for performing a currency conversion according to an embodiment disclosed herein.

FIG. 5 shows an embodiment of a method according to another aspect of this disclosure. The method shown in FIG. 5 uses what can be considered as a default currency to rank the default currency as the highest ranking conversion when a value is input in another currency. The default currency can be set by a user through a user setup or preference interface (e.g. a system locale setting in a system preference panel) or by the user in a system set-up process (e.g. when the system is first turned on after it is shipped from the factory) or by a location positioning system such as GPS. In operation 501, a data processing system receives an input of a numerical value (e.g. 10) and a currency name (Euros) as the input currency. The system in operation 503 determines the default currency (e.g., U.S. dollars) from the system locale data stored in the system and then in operation 505 the system converts the input value to the default currency and presents the converted result in the default currency. In this example, the user need not enter the desired output currency because the system assumes that is the highest ranking currency in any conversion from another currency. In operation 507, the system can optionally present other currency conversions from the input value into currencies other than the default currency.

Figure 6:
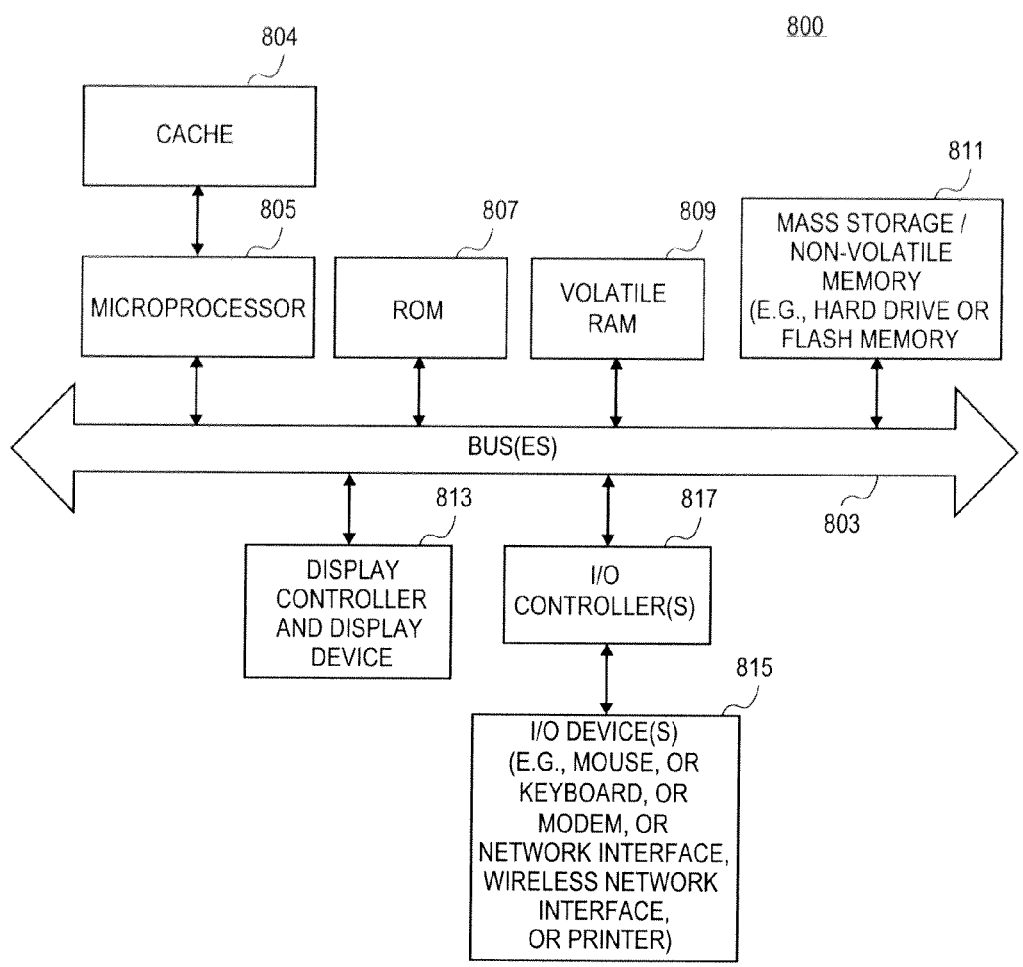
FIG. 6 is a block diagram view of an embodiment of a data processing system which can be used to implement the various embodiments described herein.

FIG. 6 shows one example of a data processing system, which may be used with any one of the embodiments described herein. Note that while FIG. 6 illustrates various components of a data processing system, it is not intended to represent any particular architecture or manner of interconnecting the components as such details are not germane to this description. It will also be appreciated that network computers, tablet computers, consumer electronic devices and other data processing systems which have fewer components or perhaps more components may also be used with one or more embodiments described herein.

As shown in FIG. 6, the computer system 800, which is a form of a data processing system, includes a bus 803 which is coupled to one or more microprocessor(s) 805 and a ROM (Read Only Memory) 807 and volatile RAM 809 and a non-volatile memory 811. The microprocessor 805 is coupled to optional cache 804. The microprocessor 805 may retrieve the stored instructions from one or more of the memories 807, 809 and 811 and execute the instructions to perform operations described above. These memories represent examples of machine readable non-transitory storage media that can store or contain computer program instructions which when executed cause a data processing system to perform the one or more methods described herein. The bus 803 interconnects these various components together and also interconnects these components 805, 807, 809 and 811 to a display controller and display device 813 and to peripheral devices such as input/output (I/O) devices 815 which may be one or more of mice, touch screens, touch pads, touch sensitive input devices, keyboards, modems, network interfaces, printers and other devices which are well known in the art. Typically, the input/output devices 815 are coupled to the system through input/output controllers 817. The volatile RAM (Random Access Memory) 709 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory system which maintain data (e.g., large amounts of data) even after power is removed from the system. Typically the mass storage 811 will also be a random access memory although this is not required. While FIG. 6 shows that the mass storage 811 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method of performing unit conversion using a data processing system having at least one processor, the method comprising:
   receiving, at the data processing system, a user input within a text input field, the user input including data indicating an input value and an input unit;
   calculating a plurality of unit conversions from the input value in the input unit to other available units thereby providing a plurality of unit conversion results each having a value in one of the other available units, wherein the other available units include one or more of: units of length, units of time, units of weight, units of velocity, units of volume, units of power, units of pressure, units of currency, or units of area;
   determining a score for each value within the plurality of unit conversion results based on the value thereby generating a plurality of scores for the unit conversion results, wherein the value is transformed by a transformation to obtain the score if the value is within a range which is less than one and greater than zero, wherein the transformation modifies values within the range to change how the modified values are sorted;
   sorting the plurality of unit conversion results into a sorted list based on the plurality of scores; and
   presenting the sorted list to a user.

2. The method of claim 1 wherein the sorting sorts the values associated with the other available units from smallest to largest.

3. The method of claim 2 wherein the transformation is a reciprocal calculation.

4. The method of claim 3 wherein the reciprocal calculation is a reciprocal of the value taken to an exponential power greater than 1.

5. The method of claim 3 wherein the sorting is performed without regard to units in the other available units for at least a set of the other available units.

6. The method of claim 1 wherein the sorting sorts values by ranking values based on how close each value is to 1.

7. The method of claim 6 wherein a set of values between zero and one are transformed by the transformation before sorting.

8. The method of claim 2 wherein a smallest value in the other available units is ranked first in the sorted list and the text input field is a search input field for searching one or more of local content on the data processing system or remote content on one or more remote data processing systems and wherein the plurality of unit conversions are calculated and sorted and the sorted list is presented without requiring an enter or return user input.

9. The method of claim 8 wherein the data processing system performs a predictive autocompletion of suggested search inputs as the user input is received and wherein the one or more local content includes full text indexed content and metadata and the remote content includes one or more databases of social media content.

10. A machine readable non-transitory storage medium storing executable instructions which when executed cause a data processing system to perform a method of performing unit conversion, the method comprising:
    receiving, at the data processing system, a user input within a text input field, the user input including data indicating an input value and an input unit;
    calculating a plurality of unit conversions from the input value in the input unit to other available units thereby providing a plurality of unit conversion results each having a value in one of the other available units, wherein the other available units include one or more of: units of length, units of time, units of weight, units of velocity, units of volume, units of power, units of pressure, units of currency, or units of area;
    determining a score for each value within the plurality of unit conversion results based on the value thereby generating a plurality of scores for the unit conversion results, wherein the value is transformed by a transformation to obtain the score if the value is within a range which is less than one and greater than zero, wherein the transformation modifies values within the range to change how the modified values are sorted;
    sorting the plurality of unit conversion results into a sorted list based on the plurality of scores; and
    presenting the sorted list to a user.

11. The medium of claim 10 wherein the sorting sorts the values associated with the other available units from smallest to largest.

12. The medium of claim 11 wherein the transformation is a reciprocal calculation.

13. The medium of claim 12 wherein the reciprocal calculation is a reciprocal of the value taken to an exponential power greater than 1.

14. The medium of claim 12 wherein the sorting is performed without regard to units in the other available units for at least a set of the other available units.

15. The medium of claim 10 wherein the sorting sorts values by ranking values based on how close each value is to 1.

16. The medium of claim 15 wherein a set of values between zero and one are transformed by the transformation before sorting.

17. The medium of claim 11 wherein a smallest value in the other available units is ranked first in the sorted list and the text input field is a search input field for searching one or more of local content on the data processing system or remote content on one or more remote data processing systems and wherein the plurality of unit conversions are calculated and sorted and the sorted list is presented without requiring an enter or return user input.

18. The medium of claim 17 wherein the data processing system performs a predictive autocompletion of suggested search inputs as the user input is received and wherein the one or more local content includes full text indexed content and metadata and the remote content includes one or more databases of social media content.

\* \* \* \* \*